United States Patent Office 3,031,439
Patented Apr. 24, 1962

3,031,439
CO-POLYMERIZATION OF ALKYLENE OXIDE
AND VINYL EPOXY COMPOUNDS
Frederick E. Bailey, Jr., Charleston, W. Va., assignor to
Union Carbide Corporation, a corporation of New
York
No Drawing. Filed Nov. 6, 1958, Ser. No. 772,158
11 Claims. (Cl. 260—88.3)

This invention relates to a process for polymerizing epoxide compounds and to the products resulting therefrom.

This application is a continuation-in-part of application Serial No. 587,934 entitled "Polymers with Ethylene Oxide," by F. E. Bailey, Jr., filed May 29, 1956, and assigned to the same assignee as the instant application.

In a broad aspect the present invention is directed to the preparation of polymers of 1,2-alkylene oxide and vinyl epoxy monomer. The term "vinyl epoxy monomer" is employed throughout the disclosure for sake of brevity and convenience; this term will be fully discussed in detail at a more appropriate section hereinafter. Polymerization is essentially effected through the epoxy groups of the monomeric reagents, and as a consequence, the resulting novel solid polymer product is characterized, along the polymer chain, by reactive pendant groups which contain a terminal vinyl or vinylidene radical, i.e., $CH_2=CH-$ or $CH_2=C<$.

The instant polymerization process is admirably suited to the preparation of novel solid polymers, the properties and characteristics of which can be "tailormade" to fit a wide variety of uses and fields of applications. The properties of the novel polymers, as initially prepared, can be varied over a wide range depending upon the proportion and kind of monomeric reagents employed. For instance, those polymers containing a major amount by weight of ethylene oxide and a minor amount by weight of vinyl epoxy monomer tend to be tough, resinous, stiff, water-soluble materials while those polymers containing lesser amounts of 1,2-alkylene oxide, e.g., ethylene oxide, tend to be flexible, semi-elastomeric materials. Moreover, the water-soluble polymers such as those containing a major amount by weight of ethylene oxide can be essentially water-insolubilized, for example, by heating at elevated temperatures, by molding at elevated temperatures, or by milling at moderately elevated temperatures, e.g., about 50° C. In addition, by virtue of the highly reactive terminal vinyl or vinylidene sites the solid polymers can be further polymerized by the use of, for example, organic peroxide catalysts such as benzoyl peroxide, acetyl peroxide, tertiary butyl hydroperoxide, and the like, to form tough, cross-linked compounds. The solid polymers of this invention also can be cured by conventional methods employed in the natural and synthetic rubber arts to form tough, cross-linked insolublized materials. As is readily apparent, the novel polymers, as initially prepared or further treated such as illustrated above, are highly useful for a variety of applications, for example, in the preparation of various molded or shaped articles, films, etc.

It is deemed appropriate at this time to define the term "reduced viscosity" since this term will be frequently employed throughout the specification. By the term "reduced viscosity," as used herein including the appended claims, is meant a value obtained by dividing the specific viscosity by the concentration of the polymer in the solution, the concentration being measured in grams of polymer per 100 milliliters of solvent at a given temperature. The reduced viscosity value is regarded as a measure of molecular weight. The specific viscosity is obtained by dividing the differences between the viscosity of the solution and the viscosity of the solvent by the viscosity of the solvent. Unless otherwise indicated, the reduced viscosity value is determined at a concentration of 0.2 gram of polymer per 100 milliliters of solvent, i.e., water, benzene, acetonitrile, at 30° C. As one would expect, the solubilities of the novel polymers vary according to their composition, and the reduced viscosity value of a given polymer is oftentimes most conveniently measured in an appropriate solvent. The solvents employed herein, as stated above, are water, acetonitrile, and benzene. In general, the reduced viscosity value of the polymer as determined in acetonitrile, when appropriate, will be a lower value than that obtained for the same polymer, under the same conditions, in water or benzene, when appropriate. A preferred class of solid polymers of the present invention have reduced viscosity values of at least about 0.5 in at least one of the three solvents described above, that is, as measured at a concentration of 0.2 gram of polymer per 100 milliliters of the solvent at 30° C. In a broad aspect, the present invention contemplates the preparation of novel, solid polymers; the resinous polymers constitute a further preferred class.

By the term "1,2-alkylene oxide," as used herein including the appended claims, is meant an organic compound which contains solely carbon, hydrogen, and oxirane oxygen, said oxirane oxygen being bonded to vicinal or adjacent carbon atoms to form the following epoxy group, i.e.,

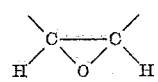

and wherein each unsatisfied epoxy carbon valence of said group is satisfied by hydrogen or a hydrocarbon radical free from ethylenic and acetylenic unsaturation, e.g., alkyl, cycloalkyl, aryl, aralkyl, or alkaryl. In addition, both unsatisfied epoxy carbon valences can be satisfied by methylene or two or more continuously linked methylene radicals which together with the epoxy carbon atoms form a saturated cycloaliphatic hydrocarbon nucleus which contains from 4 to 10 carbon atoms inclusive. It is to be understood, also, that the term "lower 1,2-alkylene oxides" designates that each unsatisfied epoxy carbon valence of the above-depicted structural unit can be satisfied by hydrogen or lower alkyl, e.g., methyl, ethyl, propyl, isobutyl and the like.

Accordingly, one or more of the following objects will be achieved by the practice of this invention.

It is an object of this invention to provide a novel process for polymerizing an admixture comprising 1,2-alkylene oxide and vinyl epoxy monomer. It is another object of this invention to prepare novel solid reactive polymers resulting from the above-said process. A further object of this invention is to provide novel solid polymers, the properties and characteristics of which can be "tailormade" to fit a wide variety of uses and fields of applications. A still further object of this invention is to provide novel reactive resinous polymers which contain a major proportion by weight of ethylene oxide and a minor proportion by weight of vinyl epoxy monomer chemically combined therein. Another object of this invention is directed to essentially insolubilizing water-soluble reactive polymers. A yet further object of this invention is directed to cross-linking reactive polymers prepared in accordance with the teachings set forth herein. These and other objects will become apparent to those skilled in the art in the light of the instant specification.

In one embodiment the monomeric 1,2-alkylene oxide employed in the polymerization process of this invention can be characterized by the following formula:

I 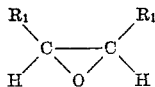

wherein each $R_1$ individually, can be hydrogen, haloaryl, or a hydrocarbon radical free from ethylenic and acetylenic unsaturation such as, for example, alkyl, aryl, cycloalkyl, aralkyl, or alkaryl radicals. In addition, both $R_1$ variables collectively can represent a divalent saturated aliphatic hydrocarbon radical which together with the epoxy carbon atoms of the epoxy group,

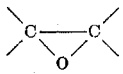

form a saturated cycloaliphatic hydrocarbon nucleus containing from 4 to 10 carbon atoms, preferably from 4 to 8 carbon atoms, for example, a saturated cycloaliphatic hydrocarbon nucleus derived from cycloalkane, alkyl-substituted cycloalkane, cyclobutane, cyclopentane, cyclohexane, cycloheptane, cyclooctane, methylcyclopentane, amylcyclohexane, and the like. Illustrative $R_1$ radicals include, among others, methyl, ethyl, propyl, butyl, isobutyl, hexyl, isohexyl, 3-propylheptyl, dodecyl, octadecyl, phenyl, halophenyl, chlorophenyl, bromo phenyl, benzyl, tolyl, ethylphenyl, butylphenyl, phenethyl, phenylpropyl, cyclopentyl, cyclohexyl, 2-methylcyclohexyl, cycloheptyl, and the like. In a preferred aspect the monomeric 1,2-alkylene oxide is a lower 1,2-alkylene oxide, that is, each $R_1$ variable can be hydrogen, methyl, ethyl, propyl, isobutyl and the like.

Representative 1,2-alkylene oxide monomers which can be employed include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadecane, 1,2-epoxyoctadecane, 5-benzyl-2,3-epoxyheptane, 4-cyclohexyl-2,3-epoxypentane, chlorostyrene oxide, styrene oxide, ortho-meta-, and para-ethylstyrene oxide, the oxabicycloalkanes, e.g., 7-oxabicyclo[4.1.0]heptane, 6-oxabicyclo[3.1.0]hexane, 4-propyl-7-oxabicyclo[4.1.0]heptane, 3-amyl-6-oxabicyclo[3.1.0]hexane and other alkyl-substituted oxabicycloalkanes; and the like.

The vinyl epoxy monomer contemplated as starting material can be characterized by the following formula:

II 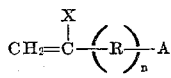

wherein R is a divalent saturated aliphatic hydrocarbon radical containing at least one carbon atom, e.g., alkylene, alkylidene; wherein $n$ is an integer equal to zero or one; wherein X is hydrogen, halogen, or alkyl; and wherein A can be epoxyalkyloxy, epoxyacyloxy, epoxyalkyl, epoxycycloalkylalkyloxy, epoxycycloalkyloxy, epoxyalkylaryl, epoxyalkylsulfonyl, and the unit

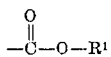

wherein $R^1$ can be epoxyalkyl or epoxycycloalkylalkyl. In addition, each epoxy carbon atom, i.e., the carbon atoms of the group

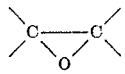

contained in the radicals encompassed within the scope of the variable A has at least one hydrogen attached thereto. Illustrative radicals for R include, for example, methylene, ethylene, propylene, butylene, 2-methylbutylene, hexylene, octylene, 2,4-dimethyloctylene, 3-propylheptylene, ethylidene, propylidene, butylidene, isopentylidene, octylidene, and the like. It is preferred that R be a lower alkylene or alkylidene radical, i.e., methylene, propylene, butylene, ethylidene, butylidene, and the like. Typical radicals for X include, among others, chorine, bromine, methyl, ethyl, propyl, amyl, 2-ethylhexyl, octyl, dodecyl, and the like. It is preferred that X be hydrogen, chlorine or lower alkyl, e.g., methyl, propyl, butyl, and the like. Representative radicals for A include, among others, epoxyethyl, 2,3-epoxypropyl, 2,3-epoxybutyl, 3,4-epoxybutyl, 2,3-epoxyhexyl, 3-propyl-4,5-epoxyheptyl, 2,3-epoxypropanoyloxy, 2,3-epoxybutanoyloxy, 2,3-epoxyhexanoyloxy, 2,3-epoxyoctanoyloxy, 3,4-epoxypentanoyloxy, 4,5-hexanoyloxy, 4,5-pentanoyloxy, 9,10-epoxyoctadecanoyloxy, 10,11-epoxyundecanoyloxy, 3,4-epoxycyclohexylcarbonyloxy, 2,3-epoxycyclopentylcarbonyloxy, glycidyl, 2,3-epoxybutoxy, 2,3-epoxypentoxy, 4,5-epoxyhexoxy, 2-ethyl-3,4-epoxyoctoxy, 6,7-epoxydecoxy, 3,4-epoxycyclohexylmethoxy, 2,3-epoxycyclopentylmethoxy, 2,3-epoxypentylethoxy, 3,4-epoxycyclohexyloxy, 2,3-epoxycyclopentyloxy, 3,4-epoxycycloheptyloxy, ortho-, meta-, and para-epoxyethylphenyl, epoxyethyltolyl, epoxyethylsulfonyl, 2,3-epoxypropylsulfonyl, 2,3-epoxybutylsulfonyl, and the like.

Illustrative vinyl epoxy monomers which can be employed as starting material include, for example, epoxy-1-alkene, e.g., 3,4-epoxy-1-butene, 2-chloro-3,4-epoxy-1-butene, 2-methyl-3,4-epoxy-1-butene, 2-bromo-3,4-epoxy-1-butene, 1,2-epoxy-3-methyl-4-pentene, 2-methyl-5,6-epoxy-1-hexene and the like; terminal alkenyl epoxyalkanoates, e.g., vinyl 4,5-epoxypentanoate, allyl 5,6-epoxyhexanoate, allyl 2,3-epoxybutanoate, allyl 3,4-epoxypentanoate, vinyl 10,11-epoxyundecanoate, allyl 10,11-epoxyundecanoate, allyl 9,10-epoxystearatae, vinyl 9,10-epoxystearate, allyl 2,3-epoxypropanoate, 3-butenyl 2,3-epoxybutanoate, 5-hexenyl 2,3-epoxyhexanoate, 4-pentenyl 2,3-epoxypentanoate, vinyl 3,4-epoxycyclohexanecarboxylate, allyl 3,4-epoxycyclohexanecarboxylate, allyl 3,4-epoxy-6-methylcyclohexanecarboxylate, 3-butenyl 2,3-epoxycyclopentanecarboxylate and the like; terminal alkenyl epoxyalkyl ether, e.g., allyl glycidyl ether, allyl 2,3-epoxybutyl ether, allyl 2,3-epoxypentyl ether and the like; terminal alkenyl epoxycycloalkyl ether and terminal alkenyl epoxycycloalkylalkyl ether, e.g., allyl 3,4-epoxycyclohexylmethyl ether, allyl 2,3-epoxycyclopentyl ether, allyl 6-methyl-3,4-epoxycyclohexylmethyl ether and the like; allyl glycidyl sulfone, 2-methyl-2-propenyl 2,3-epoxypropyl sulfone, ortho-, meta-, para-divinylbenzene monoxide, allyl 3,4-epoxycyclohexylmethyl ether, allyl 2,3-epoxycyclopentylmethyl ether, allyl 6-methyl-3,4-epoxycyclohexylmethyl ether, 2,3-epoxypropyl acrylate, 2,3-epoxybutyl acrylate, 4,5-epoxyhexyl acrylate, 3,4-epoxycyclohexylmethyl acrylate, 3,4-epoxycyclohexylmethyl methacrylate, 6-methyl-3,4-epoxycyclohexylmethyl acrylate, and the like.

By the phrase "terminal alkenyl," as used in the preceding discussion and throughout the specification including the appended claims, is meant an alkenyl radical containing the group $CH_2=C<$ therein.

Preparation of the vinyl epoxy monomers can be found in the literature. U.S. Patent No. 2,785,185, for example, teaches the preparation of epoxy-1-alkene, divinylaryl monoxide, epoxycycloalkylalkyl acylate, terminal alkenyl epoxyalkyl ether, and others. The preparation of alkenyl, cycloalkenyl, and cycloalkenylalkyl 2,3-epoxyalkanoates is taught in application Serial No. 696,039 entitled "Production of 2,3-Epoxyalkanoates," by B. Phillips and F. C. Frostick, Jr., filed November 13, 1957, and assigned to the same assignee as the instant application. In said application Serial No. 696,039, there is disclosed the reaction of an alkyl 2,3-epoxyalkanoate with an organic alcohol which contains an ethylenic bond one carbon atom removed from the hydroxyl group, in the presence of a catalytic amount of an alkali metal alcoholate or an alkaline earth metal alcoholate, e.g., sodium methoxide, calcium ethylate, etc., at a temperature in the range of from about 0° to 100° C. for a period of time preferably less than 6 hours. Incorporation by reference of said application Serial No. 696,039 is hereby made. The alkyl 2,3-epoxyalkanoate can be prepared by reacting the corresponding alkyl 2-alkenoate with peracetic acid at a temperature preferably in the range of from about 25° to 90° C. for a period of time sufficient to introduce oxirane oxygen at the site of the carbon to carbon double bond of the 2-alkenoate ester such as is disclosed in application Serial No. 696,043 entitled "Epoxidation of Unsaturated Compounds" by B. Phillips et al., filed November 13, 1957, and assigned to the same assignee as the instant application.

A distinguishing feature of the polymers of the present invention is that at least one of the monomers from which the polymers are made has both an oxirane portion and an olefinically unsaturated portion. In addition, the novel polymers can contain one or more 1,2-alkylene oxides chemically combined therein. Thus, the instant invention is admirably suited to the preparation of novel copolymers and terpolymers. The preferred polymers contain a major proportion by weight of 1,2-alkylene oxide and a minor proportion by weight of vinyl epoxy monomer, based on the total weight of 1,2-alkylene oxide and vinyl epoxy monomer. Those copolymers and terpolymers containing at least 50 weight percent of ethylene oxide, based on the weight of the polymer, are highly preferred.

The novel polymers can be prepared by contacting the monomeric reagents with a catalytically significant quantity of certain divalent metal carbonates or alkaline earth metal alcoholates, both catalyst classes described in detail hereinafter.

The divalent metal carbonates contemplated as catalysts in the process of the instant invention are the carbonates of divalent metals which have an atomic number greater than 11 and which are found below potassium and above tin in the Electromotive Force Series of Elements.[1] These divalent metals include magnesium, calcium, strontium, barium, zinc, cadmium, iron, cobalt, nickel, chromium and manganese. Particularly preferred metal carbonates, from the standpoint of increased catalytic activity and/or ease of preparation in pure form, are the Group IIA metal carbonates, i.e., the calcium strontium, or barium carbonates; Group IIB metal carbonates, i.e., the zinc or cadmium carbonates; manganous carbonate; and magnesium carbonate.

In addition to the above-enumerated divalent metal carbonates, it is also observed that the trivalent metal carbonates of the lanthanide series, i.e., rare earth metals, can be employed as catalysts in the instant invention.

It has been observed that the divalent metal carbonates should contain an amount of sorbed water, i.e., adsorbed or absorbed water, which is sufficient to significantly activate or to impart significant catalytic activity to said metal carbonates. The phenomenon regarding sorbed water contained by the metal carbonates is not entirely understood at this time nor is it the desire of the inventor to be bounded by any theories regarding adsorption or absorption phenomena. It is sufficient to say that the sorbed water contained by the metal carbonate is firmly tied thereto such that air-drying the metal carbonate for several days at room temperature or slightly above room temperature does not result in any essential weight loss of the sorbed water content in the metal carbonate. The sorbed water bound to the metal carbonates stand in contradistinction to a physical mixture of water and metal carbonate, e.g., an aqueous slurry of metal carbonate, in which latter case the water can be considered to be extraneous water or non-sorbed water. Thus, air-drying a physical mixture of water and metal carbonate results in the removal of the extraneous water or non-sorbed water content from said mixture.

The optimum amount of sorbed water to be contained by the metal carbonates is a natural limit and is governed, to a great extent, by various factors such as the particular metal carbonate contemplated, the method by which the metal carbonate was prepared, the surface area and sorptive characteristics of the metal carbonate, the operative conditions of the polymerization reaction, and other considerations. In general, the greater the surface area of the metal carbonate, the greater the amount of water which can be adsorbed and/or absorbed. As is readily understood, the more hydrophilic metal carbonates, e.g., zinc carbonate, tend to hold greater amounts of sorbed water than those metal carbonates in which the hydrophilic characteristics are slight, e.g., strontium carbonate.

Since the instant invention contemplates the use of several divalent metal carbonates as novel catalysts in the polymerization reaction, and further, since various factors or considerations will influence the optimum weight range of the sorbed water content in the metal carbonates, no simple rule of thumb can be expounded regarding an overall weight range of sorbed water content which should be contained by the metal carbonate catalysts. However, by following the illustrative teachings set forth in this specification one skilled in the art can readily determine by routine experimentation the amount of sorbed water which is necessary to impart optimum catalytic activity to the metal carbonate.

It has been observed that divalent metal carbonates which have been prepared in aqueous media and subsequently dried (by air-drying under reduced pressure at slightly elevated temperatures, until they tend to be essentially free flowing powders or until they can be so rendered such as by grinding, but not substantially beyond that point) will result in a catalytically activated metal carbonate. In other words, there is obtained a metal carbonate which contains an amount of sorbed water which is sufficient to significantly activate an otherwise essentially inactive metal carbonate. Moreover, a metal carbonate which has been rendered catalytically inactive such as by overdrying caused by heating said carbonate at high temperatures for an extended period of time, i.e., drying the carbonate past the point which deprives it of the prerequisite amount of sorbed water that is necessary to impart catalytic activity to said carbonate, can be once again rendered catalytically active by mixing or slurrying the metal carbonate in water and subsequently drying same to the point where it essentially reaches the freeflowing powdery statge.

Furthermore, when it has been observed that the divalent metal carbonates are significantly catalytically activated by virtue of the contained sorbed water the polymerization reaction is capable of being initiated within a reasonable time and at a reasonable rate, i.e., the polymerization reaction will commence within 16 hours at a rate of at least approximately 3 to 5 percent conversion per hour. The time lag noted prior to the initiation of the polymerization reaction is generally known as the induction period. In general, the polymerization reaction is initiated within a reasonable time and at a reasonable rate when the minimum quantity of sorbed water is about 0.01–0.02 weight percent, based on the weight of the divalent metal carbonate catalyst. It is preferred, in general, that the minimum quantity of sorbed water be above about 0.1 weight percent, based on the weight of the divalent metal carbonate catalyst. The upper limit regarding the amount of sorbed water which the catalyst can contain is a natural limit depending, to a great extent, on various factors such as those previously discussed.

The sorbed water content of the metal carbonate can be readily determined by various means which are well-known to the art. For instance, a weighed quantity of powdery metal carbonate, e.g., strontium carbonate, can be heated to a temperature of about 350° to 400° C. until an essentially constant weight metal carbonate is obtained. The weight difference in the original sample and the heat-treated sample (to constant weight) is the loss of essen-

---

[1] Handbook of Chemistry and Physics, 38th. edition, p. 1660; published by Chemical Rubber Co., Cleveland, Ohio.

tially sorbed water in the original sample. The weight percent of sorbed water in the original metal carbonate sample thus is readily calculable. However, should the metal carbonate decompose or should the danger of decomposition exist under the conditions noted in the above-described determination of sorbed water content, an alternative method can be employed such as is immediately illustrated. For example, zinc carbonate can undergo at least partial decomposition at 350 to 400° C. to zinc oxide and carbon dioxide. Thus, a weight quantity of powdery zinc carbonate can be inserted into a quartz tube which is then placed into an ignition furnace maintained at approximately 425° C. A continuous stream of high purity nitrogen is subsequently passed over the zinc carbonate and through a weighed tube containing, for example, magnesium perchlorate. The magnesium perchlorate is an agent which readily absorbs water but not carbon dioxide. This operation is continued until the zinc carbonate is essentially decomposed to zinc oxide (and this point will be reached when the heated sample has attained a constant weight). The increased weight of the tube containing magnesium perchlorate is attributable to the sorbed water given off during heat treatment of the carbonate sample. Again, the weight percent of sorbed water contained by the zinc carbonate sample thus is readily determined.

To illustrate the catalytic activity imparted to the metal carbonate by virtue of the contained sorbed water, one preparation of strontium carbonate (prepared by bubbling carbon dioxide into a solution of strontium hydroxide octahydrate in distilled water, and subsequently recovering the resulting strontium carbonate precipitate) which was dried at 50° C. for 16 to 18 hours contained approximately 3 weight percent of sorbed water. This catalyst was found to be satisfactorily active as a polymerization catalyst at a concentration of 3 weight percent (based on the weight of reagent). A sample of this strontium carbonte dried at higher temperatures wherein the amount of sorbed water was decreased to approximately 0.1 to 0.2 weight percent exhibited virtually unchanged catalytic activity. However, when dried for 16 to 18 hours at about 325° C. the sorbed water content contained in the strontium carbonate was reduced to about 0.01 to 0.02 weight percent. At this point, the catalytic activity of the strontium carbonate containing about 0.01 to 0.02 weight percent was lessened as compared to the strontium carbonate containing about 0.1 to 0.2 weight percent sorbed water. Further drying at temperatures above 350° C. for an additional 16 to 18 hours rendered the strontium carbonate essentially catalytically inactive.

By way of another illustration, zinc carbonate (prepared in a manner similar to that set out in Example 9) containing approximately 20 weight percent sorbed water was an active polymerization catalyst at a concentration of 3 weight percent with essentially no induction period being observed. Increasing the sorbed water content on the zinc carbonate up to 48 weight percent correspondingly increased the induction period of the polymerization reaction. For example, an induction period of several minutes was observed with zinc carbonate containing 28 weight percent sorbed water whereas the induction period increased to 24 hours, and longer, with the use of zinc carbonate containing 48 weight percent sorbed water.

As previously indicated, the water associated with the catalytic activity of the metal carbonates is sorbed water. Non-sorbed water or extraneous water does not directly affect the catalytic activity of the metal carbonate catalyst; however, non-sorbed water or extraneous water present with the catalyst or contained in the monomeric reagents can inordinately prolong the induction period or the initiation of the polymerization reaction. Consequently, it is highly desirable to minimize the quantity of non-sorbed water present in the charge comprising catalyst and monomeric reagents. Factors which influence the amount of non-sorbed water to be tolerated in a particular system in order to obtain optimum operative conditions are, for example, the particular metal carbonate employed, the particle size of the metal carbonate, the method by which the metal carbonate was prepared, the monomeric reagents employed, and other considerations. Generally, satisfactory polymerization rates are obtained when the quantity of non-sorbed water or extraneous water present in the charge comprising catalyst and monomeric reagents does not exceed about 1 weight percent, preferably about 0.5 weight percent, based on the weight of monomeric reagents; however, higher quantities of non-sorbed water can be present but, as stated previously, the induction period may be unduly increased. Consequently, it is highly preferred that the metal carbonate catalyzed polymerization reaction be conducted under substantially anhydrous conditions.

It has also been observed that certain adsorbed or occluded ions such as the highly oxygen-containing and "thio-oxygen" containing anions tend to decrease the catalytic activity of the metal carbonate catalyst. A notable exception is the sulfate ion. On the other hand, adsorbed or occluded chloride, cyanide or acetate ions do not appear to deleteriously affect the catalytic activity of the metal carbonates. It is further desirable that the divalent metal carbonates be prepared in the absence of nitrate ion, chlorate ion, thiosulfate ion, or tetraborate ion since the substantial presence of these ions can result in considerably long induction periods. However, thoroughly water-washing the divalent metal carbonates prepared in the presence of the above-illustrated interfering ions will serve to essentially remove these ions.

The metal carbonates suitable as catalysts in the process of the instant invention can be prepared by reacting the corresponding divalent metal salt, e.g., the divalent metal chloride, cyanide, and acetate, with sodium carbonate, or other soluble carbonates, and subsequently recovering the resulting divalent metal carbonate precipitate. When the hydroxide of the divalent metal is soluble, the divalent metal carbonate can be obtained as a precipitate by bubbling carbon dioxide into an aqueous solution containing the soluble divalent metal hydroxide. The divalent metal carbonate contemplated as catalysts can also be prepared from salts of the appropriate divalent metal in which the anionic component thereof is one of the interfering ions enumerated previously. However, the preparation should be carried out so as to minimize the presence of adsorption or occlusion of these interfering ions in the desired carbonate product, e.g., slow precipitation of the carbonate product from relatively dilute aqueous solution, followed by thorough washing or digesting said precipitated carbonate with water or water-containing carbon dioxide.

The divalent metal carbonate is employed in catalytically significant quantities, and, in general, a catalyst concentration in the range of from about 0.01 to about 5.0 weight percent, based on the total weight of monomeric material, is suitable. A catalyst concentration of from about 0.3 to about 3.0 weight percent is preferred. For optimum results, the particular divalent metal carbonate employed, its preparation, its surface area, the nature of the vinyl epoxy monomer and 1,2-alkylene oxide, the operative temperature at which the polymerization reaction is conducted, and other factors will largely determine the desired catalyst concentration.

The second class of catalysts contemplated in the instant process to produce novel polymers are the alkaline earth metal alcoholates. The term "exposure-activated" alkaline earth metal alcoholates will be employed in this specification, including the appended claims, to designate those alkaline earth metal alcoholates which have been exposed to (contacted with) water and carbon dioxide according to the teachings herein set forth. The alkaline earth metal alcoholates are compounds containing alkaline earth metal, i.e., strontium, calcium, or barium, in which the metal portion is bonded to mono- or polyhydroxy organic compounds, e.g., alkanols, cycloalkanols, alkylene glycols, or phenols, through the hydroxyl oxygen of at least one of the hydroxy groups of said organic compound. Expressed differently, the alkaline earth metal alcoholates can be characterized by the following formula:

III  RO—M—OR wherein M is an alkaline earth metal, i.e., strontium, calcium or barium; and wherein each R variable can be considered to be derived from the same or different mono- or polyhydroxy organic compounds. It is to be understood, of course, that when R is a polyhydroxy organic compound, each M valence also can be separately bonded through two different hydroxyl oxygens of the same R atom, i.e.,

in which case R also may or may not have free hydroxyl groups (—OH) attached thereto.

The organic portion of the alkaline earth metal alcoholates can be derived, for example, from primary, secondary, and tertiary alkanols and cycloalkanols, e.g., methanol, ethanol, n-propanol, isobutanol, n-pentanol, isopentanol, n-hexanol, dodecanol, 2-ethylhexanol, 2,2-dimethyloctanol, benzyl alcohol, 2-phenylethanol, diphenylcarbinol, pentaerythritol, cyclopentanol, cyclohexanol,4-butylcyclohexanol, 3-octylcyclopentanol, cycloheptanol, and the like; from mono- and poly-alkylene glycols, e.g., ethylene glycol, propylene glycol, the butanediols, the pentanediols, 2-methyl-2,3-butanediol, 2-ethyl-1,6-hexandiol, 4,5-octanediol, 1,9-nonanediol, glycerol, β-methylglycerol, diethylene glycol, dipropylene glycol, dibutylene glycol, dipentylene glycol, dihexylene glycol, and the like; from monoalkyl and monoaryl ethers of mono- and polyalkylene glycols, e.g., 2-methoxyethanol, 2-ethoxyethanol, 2-butoxyethanol, 2-benzyloxyethanol, 3-propoxypropanol, 4 - hexoxybutanol, 6- benzyloxyhexanol, 2 - (β - methoxyethoxy)ethanol, 2-(β-butoxyethoxy)ethanol, 3-(β-ethoxypropoxy)propanol, 4-(β-hexoxybutoxy)butanol, and the like; from mono- and polyhydroxy-containing aromatic and polyaromatic (including fused aromatic) hydrocarbons, e.g., phenol, resorcinol, catechol, pyrogallol, the cresols, alkyl-substituted phenol, the xylenols, 2,2'-, 2,4'-, 3,3'-, and 4,4'-dihydroxybiphenyl, the naphthols, the naphthalenediols, and the like. The organic portion of the alkaline earth metal alcoholates also can be derived from organic compounds containing both alcoholic hydroxyl and phenolic hydroxyl groups. In addition, the organic portion can contain unreactive groups or groups which do not materially affect the polymerization reaction such as alkoxy, aryloxy, aralkyloxy, alkaryloxy, thio-ether groups, halogen bonded to aromatic carbon, sulfones, aromatic nitro groups, amino groups, and the like.

The catalytic activity of the alkaline earth metal alcoholate can be enhanced upon moderate exposure of said alcoholate to carbon dioxide and water. Such exposure results in a weight increase of the alkaline earth metal alcoholate. However, no simple rule of thumb can be given for determining the optimum weight gain necessary to impart maximum catalytic activity to the alcoholate by exposure to carbon dioxide and water since the particular metal alcoholate of choice, its preparation, its surface area, the operative conditions of the polymerization reaction, etc., are influencing factors to be considered in each case. It has been observed that alkaline earth metal alcoholates in which the organic portion is derived from lower saturated aliphatic alcohols, e.g., methanol and ethanol, require less exposure (or less weight gain), than is the case when the organic portion is derived from, for example, n-hexanol, 2-butoxyethanol, alkylene glycols, and the like, to provide enhanced catalytic activity. Exposure of the preparation of calcium ethylene glycoxide (prepared in a manner similar to that set out in Example 1) to carbon dioxide substantially saturated with water vapor disclosed that the catalytic activity increased with increase in weight of said glycolate up to a weight gain of about 60 percent; thereafter the catalytic activity began to decrease. However, even after a gain in weight of about 70 percent, the glycolate was still more active than the unexposed or untreated compound, i.e., calcium ethylene glycolate. In this particular illustration, the optimum gain in weight was ascertained to be about 45 to 60 percent.

The alkaline earth metal alcoholates can be prepared, for example, by reacting the appropriate alkaline earth metal with the desired hydroxy-containing organic compound. The preparation can be conducted in an inert or substantially inert organic diluent, e.g., dioxane, or liquid ammonia, or in an excess of the hydroxy-containing organic compound itself. It is preferred that the preparation of the alkaline earth metal alcoholates be conducted under an inert atmosphere such as butane, nitrogen, and the like. During the preparation and storage of the alkaline earth metal alcoholates, it is desirable to minimize the presence of carbon dioxide, water, and reactive gases which may come in contact with said alcoholates.

The alkaline earth metal alcoholates in which the organic portion is derived from dihydroxy-containing organic compounds, e.g., ethylene glycol, 1,2-propylene glycol, and the like, can be prepared by reacting the alkaline earth metal per se with the desired dihydroxy-containing organic compound, or, for example, alkaline earth metal methylate with the desired dihydroxy-containing organic compound, preferably in an inert organic diluent. When the latter is employed, it is desirable to heat the reaction medium to a temperature sufficient to remove (in this illustration) the methanol which is given off during the reaction between the alkaline earth metal methylate and the dihydroxy-containing organic compound. A preferred method of preparation is to react the desired dihydroxy-containing organic compound with the alkaline earth metal per se dissolved in liquid ammonia. The resulting product is then recovered by allowing said liquid ammonia to evaporate therefrom; if desired, the recovered product then can be converted to a finely divided state such as by grinding, pulverizing and the like, under an inert atmosphere.

It should be noted that in the preparation of alkaline earth metal alcoholates such as illustrated above, the presence of the reactants in stoichiometric equivalency in the reaction mixture is not narrowly critical. As an illustration, favorable catalytic activity in products prepared by the reaction of 0.95 to 2.0 mols of ethylene glycol per mol of calcium metal was observed.

As stated previously, enhanced catalytic activity is imparted to the alkaline earth metal alcoholates by exposure to carbon dioxide and water. This can be accomplished, for example, by exposing the alcoholate to moist carbon dioxide, preferably carbon dioxide saturated with water vapor, until a weight gain of at least about 0.01 percent, preferably at least about 0.1 percent is observed.

The alkaline earth metal alcoholates and their exposure activated counterparts are employed in catalytically significant quantities, and in general, a catalyst concentration in the range of from about 0.01 to about 10 weight percent, based on the total weight of monomeric material, is suitable. A catalyst concentration of from about 0.1 to about 2.0 weight percent is preferred. For optimum results, the particular catalyst employed, its preparation, its surface area, the nature of the vinyl epoxy monomer and 1,2-alkylene oxide, the operative temperature at which the polymerization reaction is conducted, and other factors will largely determine the desired catalyst concentration.

The proportion of the reagents, i.e., epoxy vinyl monomer and 1,2-alkylene oxide, can vary over a wide range. Preferably the concentration of either reagent is in the range of from about 5 to about 95 weight percent, based on the total weight of the reagents. In a preferred aspect the copolymer and terpolymer products of this invention comprise from about 5 to 95 weight percent 1,2-alkylene oxide and from about 95 to 5 weight vinyl epoxy monomer based on the weight of the polymer, chemically combined therein. In a further preferred aspect the novel copolymer and terpolymer products comprise at least about 50 to about 95 weight percent 1,2-alkylene oxide, preferably ethylene oxide, and from about 50 to about 5 weight percent vinyl epoxy monomer chemically combined therein.

The polymerization reaction can be conducted at a temperature in the range of from about 70°, and lower, to about 150° C., and preferably from about 90° to about 150° C. As a practical matter, the choice of the particular temperature at which to effect the polymerization reaction depends, to an extent, on the nature of the vinyl epoxy monomer and 1,2-alkylene oxide employed, the particular catalyst employed, the concentration of the catalyst, and the like.

In general, the reaction time will vary depending on the operative temperature, the nature of the vinyl epoxy monomer and 1,2-alkylene oxide employed, the particular catalyst and the concentration employed, the use of an inert organic diluent, and other factors. The reaction time can be as short as a few hours, or shorter, in duration or it can be as long as several days. A feasible and suitable reaction period is from about 5 hours, and lower, to about 100 hours, and longer.

The polymerization reaction takes place in the liquid phase and a pressure above atmospheric may be employed to maintain the liquid phase. However, in the usual case, external pressure is unnecessary, and it is only necessary to employ a reaction vessel capable of withstanding the autogenous pressure of the reaction mixture. It is highly desirable to conduct the polymerization reaction under substantially anhydrous conditions.

In carrying out the polymerization reaction an induction period may be observed prior to the initiation of the polymerization reaction; this induction period can be as short as, or shorter than, minutes in length or it can be several hours in duration.

The copolymers of this invention can be prepared via the bulk polymerization, suspension polymerization, or the solution polymerization routes. The polymerization reaction can be carried out in the presence of an inert organic diluent such as, for example, aromatic solvents, e.g., benzene, chlorobenzene, toluene, xylene, ethylbenzene, and the like; various oxygenated organic compounds such as anisole, the dimethyl and diethyl ethers of ethylene glycol, of propylene glycol, of diethylene glycol and the like; normally-liquid saturated hydrocarbons, e.g., pentane, hexane, heptane; cycloalkanes, e.g., cyclopentane, cyclohexane, and the like.

Certain impurities which may be present in the monomeric feed tend to increase the induction period. These impurities are carbon dioxide, oxygen, water, and aldehydes. Small amounts of these impurities can be tolerated; however, it is highly advantageous to employ high purity reagents, catalyst, etc. thus avoiding inordinately prolonged induction periods.

In various illustrative examples below the procedure employed to prepare the polymer was as follows. A 9-inch Pyrex tube 22 mm. in diameter was sealed at one end; the other end of the tube was fitted with a 3-inch piece of 8 mm. Pyrex tubing. The tube was cleaned, dried and flushed with dry nitrogen; a weighed quantity of catalyst was then introduced into the tube. The monomeric mixture was charged to the tube in a "dry box" containing a nitrogen atmosphere. The tube was then closed with a rubber cap, followed by cooling in Dry Ice-acetone bath; the tube was sealed under the vacuum thus obtained. The sealed tube was subsequently inserted into an aluminum block, said aluminum block being gently agitated by rocking at the desired operating temperature for a given period of time. After this, the tube was broken open and the reaction product was placed in a vacuum, e.g., about 10 to 30 mm. of Hg at 30°–40° C., until dried. In other various examples, the polymerization reaction was conducted in a two-liter, stainless steel stirred autoclave.

EXAMPLE 1

Calcium metal (10 grams) is dissolved in 350 milliliters of liquid ammonia. To the resulting solution there is slowly added a solution of 15.5 grams of ethylene glycol in 350 milliliters of liquid ammona under continuous stirring. Subsequently, the ammonia is allowed to weather off for a period of 16 to 18 hours. The resulting grayish-white product then is pulverized, under a nitrogen atmosphere, to a finely divided powdery state. This powdery product is spread on a petri dish which is then inserted into a desiccator. Moist carbon dioxide, generated by bubbling carbon dioxide through a water bubbler, is then introduced into the desiccator via a gas inlet conduit, said desiccator being maintained at about 25° C. The powdery product is exposed to this treatment for 3 to 4 hours until there is a weight increase of between about 46 to 56 percent in said powdery product. Subsequently said exposed product is placed under vacuum (3 to 5 mm. of Hg) at a temperature of 57° C. for a period of about 2 to 3 hours until there is a weight loss of about 18 to 26 percent. The "exposure activated" calcium ethylene glycoxide thus produced is catalytically active.

EXAMPLE 2

Strontium metal (22 grams) was dissolved in 500 milliliters of liquid ammonia. To the resulting solution there was slowly added a solution of 16 grams of ethylene glycol in 200 milliliters of liquid ammonia under continuous stirring. Subsequently, the ammonia was allowed to weather off for a period of 16 to 18 hours until a dry, grayish-white product remained. The resulting product, strontium glycoxide, was pulverized to a finely divided powdery state under a nitrogen atmosphere, and subsequently, this powdery product was divided into several portions. Each portion except the control was individually placed into a desiccator and moist carbon dioxide generated by bubbling carbon dioxide through a water bubbler, was introduced into the desiccator (maintained at approximately 25° C.) for varying periods of time. These "exposure activated" strontium glycoxides were catalytically active. Other pertinent data are disclosed in Table I below.

Table I

| Sample Number | Catalyst [1] | Exposure Time; Hours | Weight Percent Gain [2] |
|---|---|---|---|
| 1 | strontium glycoxide | 0.00 | |
| 2 | ----do---- | 0.25 | 7.5 |
| 3 | ----do---- | 0.5 | 10.9 |
| 4 | ----do---- | 1.0 | 19.1 |
| 5 | ----do---- | 2.0 | 40.4 |
| 6 | ----do---- | 3.0 | 46.5 |
| 7 | ----do---- | 5.0 | 53.6 |
| 8 | ----do---- | 5.5 | 53.6 |

[1] Exposed to moist carbon dioxide as indicated.
[2] Based on the weight of strontium glycoxide prior to exposure to moist carbon dioxide.

EXAMPLE 3

Barium metal (34.4 grams) was dissolved in 1000 milliliters of liquid ammonia. To the resulting solution there was slowly added a solution of 37.1 grams of n-butanol in 300 milliliters of liquid ammonia under continuous stirring. Subsequently, the ammonia was allowed to weather off for a period of 16 to 18 hours until a dry, grayish-white product remained. The resulting product, barium butylate, was pulverized to a finely divided powdery state under a nitrogen atmosphere, and subsequently, this powdery product was divided into several portions. Each portion except the control was individually placed into a desiccator and moist carbon dioxide, generated by bubbling carbon dioxide through a water bubbler, was introduced into the desiccator (maintained at approximately 25° C.) for varying periods of time. These "exposure activated" barium butylate were catalytically active. Other pertinent data are disclosed in Table II below.

*Table II*

| Sample Number | Catalyst [1] | Exposure Time; Hours | Weight Percent Gain [2] |
|---|---|---|---|
| 1 | barium butylate | 0.00 | |
| 2 | ___do___ | 0.17 | 8.6 |
| 3 | ___do___ | 0.5 | 7.1 |
| 4 | ___do___ | 0.00 | |
| 5 | ___do___ | 0.08 | 14 |

[1] Exposed to moist carbon dioxide as indicated.
[2] Based on the weight of barium butylate prior to exposure to moist carbon dioxide.

EXAMPLE 4

Calcium metal (20 grams) was dissolved in 1500 milliliters of liquid ammonia. To the resulting solution there was slowly added a solution of 29.4 grams of ethylene glycol in 400 milliliters of liquid ammonia under continuous stirring. Subsequently, the ammonia was allowed to weather off for a period of 16 to 18 hours until a dry, grayish-white product remained. The resulting product, calcium glycoxide, was pulverized to a finely divided powdery state under a nitrogen atmosphere, and subsequently, this powdery product was divided into several portions. Each portion except the control was individually placed into a desiccator and moist carbon dioxide, generated by bubbling carbon dioxide through a water bubbler, was introduced into the desiccator (maintained at approximately 25° C.) for varying periods of time. These "exposure activated" calcium glycoxides were catalytically active. Other pertinent data are disclosed in Table III below.

*Table III*

| Sample Number | Catalyst [1] | Exposure Time; Hours | Weight Percent Gain [2] |
|---|---|---|---|
| 1 | calcium glycoxide | 0.00 | |
| 2 | ___do___ | 0.08 | 6.3 |
| 3 | ___do___ | 0.17 | 13.6 |
| 4 | ___do___ | 0.5 | 22.6 |
| 5 | ___do___ | 1.0 | 26.0 |
| 6 | ___do___ | 3.0 | 57.8 |
| 7 | ___do___ | 4.0 | 75.0 |
| 8 | ___do___ | 3.0 | 64.8 |

[1] Exposed to moist carbon dioxide as indicated.
[2] Based on the weight of calcium glycoxide prior to exposure to moist carbon dioxide.

EXAMPLE 5

Strontium carbonate was precipitated by bubbling carbon dioxide into an aqueous solution of strontium hydroxide octahydrate. The precipitated strontium carbonate was recovered by filtration and subsequently, various samples thereof were heated at different temperatures. One sample was heated at 55° C. until the strontium carbonate contained about 1.5 weight percent sorbed water; a second sample was heated at 120° C. until the strontium carbonate contained about 1.0 weight percent sorbed water; and a third sample was heated at 200° C. until the strontium carbonate contained about 0.5 weight percent sorbed water. All three of these samples were observed to be active polymerization catalysts.

On continued heating the said three strontium carbonate samples above 250° C., the catalytic activity thereof was progressively reduced. On heating the samples at a temperature of 350° to 400° C. for 24 to 48 hours, i.e., to a point wherein the sorbed water was essentially nil, the strontium carbonate samples became essentially inactive as catalysts.

EXAMPLE 6

Cadmium sulfate (208 grams) was dissolved in one liter of water, and 100 grams of potassium bicarbonate was dissolved in a second liter of water. Both solutions were then cooled to 1° C. Subsequently, the bicarbonate solution was added to the cadmium sulfate solution, with vigorous stirring, over a period of about 30 to 35 minutes. The resulting precipitate was recovered by filtration and washed three times with cold, carbon dioxide-saturated distilled water. The cadmium carbonate precipitate was then dried for 24 hours at 180° C. The cadmium carbonate sample was catalytically active.

EXAMPLE 7

Ferrous chloride tetrahydrate (20 grams) was dissolved in one liter of distilled water. Sodium carbonate (11 grams) was dissolved in a second liter of water. The sodium carbonate solution then was slowly poured, under vigorous stirring, into the ferrous chloride solution. The resulting ferrous carbonate precipitate was filtered, washed four times by slurrying in distilled water, and then dried in an oven at 128° C. for 20 hours. The ferrous carbonate was catalytically active.

EXAMPLE 8

Zinc oxide (54 grams) was added to one liter of 5 percent sulfuric acid. The solution was brought to a boil and then 20 milliliters of concentrated sulfuric acid were added thereto. To the resulting clear solution (after cooling to 3° C.) there was added one liter of a cold solution of potassium bicarbonate saturated with carbon dioxide. The precipitated zinc carbonate was recovered by filtration, washed several times with cold water, and subsequently dried for 24 hours in a desiccator maintained at 120° C. The zinc carbonate was catalytically active.

EXAMPLE 9

A saturated solution of calcium hydroxide was prepared at room temperature, i.e., approximately 25° C. Calcium carbonate was precipitated by bubbling carbon dioxide through this solution. The resulting calcium carbonate solution was recovered by filtration, and dried at 120° C. for 2 hours. The calcium carbonate was catalytically active.

EXAMPLE 10

A solution of 10.6 grams of sodium carbonate in 200 milliliters of distilled water was slowly poured into a stirred solution containing 24.4 grams of barium chloride dihydrate in one liter of distilled water. The resulting barium carbonate precipitate was recovered by filtration and dried at 120° C. for a period of 93 hours. The barium carbonate was catalytically active.

Butadiene monoxide [1] (3 grams), ethylene oxide (27 grams), and strontium carbonate (0.9 gram, containing approximately 0.5 weight percent sorbed water) were sealed in a small glass tube and agitated in a water bath at 92° C. for 64 hours. A yield of 100 percent solid polymer was obtained. The reduced viscosity values of the polymer in water, acetonitrile, and benzene, respectively, at a concentration of 0.2 gram of polymer per 100 milliliters of solvent at 30° C. were as follows: water 3.3; acetonitrile, 2.2; benzene, 3.3.

When 2-methyl-2,3-epoxypropyl acrylate and propylene oxide is substituted for the above-mentioned monomeric feed, a resinous copolymer is obtained which discloses ethylenic unsaturation upon infra-red analysis.

EXAMPLES 12–17

The procedure of Example 11 was repeated in the following six experiments. The total weight of the monomeric charge was 30 grams; 0.9 gram of strontium carbonate (approximately 0.5 weight percent sorbed water) was employed in all the runs. The pertinent data and results are shown in Table IV below.

[1] Purity, 97.4 percent; boiling point, 67° C./atm.; $n_D^{30}$, 1.4124. Butadiene oxide employed in Examples 12–20 was from the same batch.

Table IV

| Example | Butadiene Monoxide[1] | Ethylene Oxide[1] | Yield (percent) | Reduced Viscosity in— | | |
|---|---|---|---|---|---|---|
| | | | | Water | Acetonitrile | Benzene |
| 12 | 10 | 90 | 98 | -------- | 2.5 | 3.0 |
| 13 | 10 | 90 | 94 | 2.7 | 2.1 | -------- |
| 14 | 20 | 80 | 91 | 2.9 | 2.5 | 3.4 |
| 15 | 20 | 80 | 100 | 3.1 | 2.3 | 3.4 |
| 16 | 20 | 80 | 72 | 2.8 | 2.1 | 3.0 |
| 17 | 30 | 70 | 80 | 2.9 | 2.4 | 2.5 |

[1] Weight percent of component in question, based on the total weight of monomeric feed.

EXAMPLE 18

Butadiene monoxide (3 grams), ethylene oxide (27 grams), and strontium carbonate (0.9 gram, containing approximately 0.5 weight percent sorbed water) were sealed in a small glass tube and agitated in a water bath 95° C. for 88 hours. A yield of 100 percent solid polymer was obtained. The reduced viscosity values of the polymer in water, acetonitrile, and benzene, respectively, at a concentration of 0.2 gram of polymer per 100 milliliters of solvent at 30° C. were as follows: water, 2.3; acetonitrile, 1.7; benzene, 3.0.

In a manner similar to the above procedure, 2,3-butylene oxide and allyl 9,10-epoxystearate can be polymerized to give a solid polymer which discloses, under infra-red examination, ethylenic unsaturation.

EXAMPLE 19

Butadiene monoxide (3 grams), 1,2-epoxybutane (9 grams), ethylene oxide (18 grams) and strontium carbonate (0.9 gram, containing about 0.5 weight percent sorbed water) were sealed in a small glass tube and agitated for 88 hours at 95° C. in a water bath. A resinous polymer was obtained which possessed a reduced viscosity value in benzene of 3.1, and in acetonitrile of 1.2. On heating to about 100° C. for 5 minutes the resin water-insolubilized and displayed a rubber-like elasticity.

EXAMPLE 20

The resinous polymers from Examples 12, 15, 18, and 19 were insolubilized by milling, molding or other treatment as indicated in Table V below. Various physical properties of the polymers after the indicated treatment are also tabulated therein. The results and pertinent data are set forth in Table V below.

Table V

| Example | 12 | 15 | 18 | 19 |
|---|---|---|---|---|
| Milled, min./° C | 15/30-40 [1] | -------- | 5/30-50 | -------- |
| Molded, min./° C | 30/140-145 | 30/140 | 30/140 | -------- |
| Water Solubility after: | | | | |
| 1. Milling | Insoluble[2] | -------- | Insoluble[2] | Insoluble.[2] |
| 2. Molding | ---do------ | Insoluble[2] | ---do------ | Do. |
| Tensile, p.s.i. | 1,400 | 950 | -------- | -------- |
| Elongation, Percent | 650 | 550 | -------- | -------- |
| Load at 100% Elong., p.s.i. | 1,175 | 700 | -------- | -------- |
| ASTM Stiffener Modulus | 11,150 | 10,000 | -------- | -------- |
| Flex. Temperature: | | | | |
| ($T_F$)° C | −50 | −57 | -------- | -------- |
| $T_4$, ° C | 15 | 7 | -------- | -------- |
| Brittle Temperature, ($T_B$)° C | −44 | −46 | -------- | -------- |
| Durometer Hardness "A" | 93 | 88 | -------- | -------- |

[1] The ethylene oxide copolymer was fluxed on a two-roll mill heated to 35-40° C. For each 100 parts by weight of the resin there were added, by weight, in the following order one part of "Agerite" powder (phenyl-beta-naphthylamine), two parts sulfur, three parts stearic acid, one part "Captax" (mercaptobenzothiozol), 0.9 part "Accelerator 808" (butyraldehyde-aniline condensation product marketed by E. I. du Pont de Nemours Company, Inc.) and five parts zinc oxide. The compounded material thus obtained was then cured in a 5.5-inch mold at 140-145° C. for 30 minutes to obtain test specimens used in determining the physical properties listed.
[2] Very slight swelling.

The data presented in Table V were determined as follows:

TENSILE AND ELONGATION

Standard test specimens were evaluated on a Scott L-6 Tensile Tester operated at a rate of four feet of extensibility per minute.

A.S.T.M. STIFFNESS MODULUS

In accordance with the procedures given in A.S.T.M. Method D-747-50.

FLEX. TEMPERATURES ($T_F$)° C. corresponds to the temperature at which the specimen shows a torsional stiffness of 135,000 p.s.i. as determined from a curve obtained in accordance with A.S.T.M. Method D-1043-51.

($T_4$)° C. corresponds to the temperature at which the specimen shows a torsional stiffness of 10,000 p.s.i. as determined from a curve obtained in accordance with A.S.T.M. Method D-1043-51.

($T_B$)° C. denotes the brittle temperature as determined in accordance with A.S.T.M. Method D-746-55T.

DUROMETER HARDNESS "A"

In accordance with the procedures given in A.S.T.M. Method D-676-42T.

EXAMPLE 21

Chloroprene oxide (3 grams), ethylene oxide (27 grams), and strontium carbonate (3.0 weight percent, based on total weight of monomeric feed, containing approximately 0.5 weight percent sorbed water) were sealed in a small test tube and agitated in a water bath at 90° C. for 66 hours. The yield was 18.5 grams of resinous polymer which had a reduced viscosity value of 1.64 in acetonitrile.

In an analogous manner as above, when equal parts by weight of propylene oxide and allyl 3,4-epoxycyclohexenecarboxylate are polymerized in the presence of 3.0 weight percent of the above-named catalyst, a resinous copolymer is obtained which, upon infra-red analysis, discloses ethylenic unsaturation.

EXAMPLE 22

To a two-liter, stainless steel stirred autoclave, there were charged 256 grams ethylene oxide, 18 grams butane (vapor phase stabilizer for the ethylene oxide) 14.5 grams butadiene monoxide, 572 grams toluene and 0.87 gram "exposure activated" calcium glycoxide prepared in the manner set forth in Example 1 supra. The reaction mixture was stirred at 102-107° C. for 20 hours. At the end of this time, the polymer product was precipitated from toluene solution with hexane, recovered, and dried under vacuum at 30° C. a 69 percent yield (186 grams) of polymer was obtained. The polymer had a reduced viscosity of 1.25 acetonitrile. This resin was found to contain 2.3 percent butadiene monoxide by iodine titration.

In a manner similar to the above procedure when 100 grams of 1,2-epoxypentane and 150 grams of allyl 3,4-epoxycyclohexylmethyl ether are polymerized in the presence of 1.0 weight percent of the above-designated catalyst (based on the total weight of monomeric charge), a resinous copolymer is obtained which disclosed, under infra-red analysis, ethylenic unsaturation.

EXAMPLE 23

Twenty grams of toluene, 9.5 grams of ethylene oxide, and 0.5 gram of allyl-2,3-epoxybutyl ether together with 0.13 gram of exposure activated calcium glycoxide catalyst were sealed in a Pyrex glass polymerization tube. The catalyst was prepared in the manner set forth in Example 1 supra. The tube was gently agitated at 90° C. for 45 hours. At the end of this period of time, the tube was broken and the polymer product was precipitated from the toluene solution by the addition of hexane thereto. The polymer was recovered by filtration, and dried under vacuum at 30° C. Substantially complete conversion to polymer was obtained. The copolymer was found to have a reduced viscosity of 4.2 in 0.2 weight percent solution in both benzene and acetonitrile at 30° C. By iodine titration, the copolymer was found to contain 3.8 percent of the allyl 2,3-epoxybutyl ether combined in the resin.

When an equivalent molar amount of epoxycyclohexane is substituted for the ethylene oxide, a resinous copolymer is obtained which, under infra-red analysis, discloses ethylenic unsaturation.

EXAMPLE 24

To a two-liter, stainless steel stirred autoclave, there were charged 203 grams of ethylene oxide, 14 grams of butane, 72 grams of allyl glycidyl ether, and 572 grams of toluene together with 1.44 grams of "exposure activated" calcium glycoxide catalyst prepared in the manner set forth in Example 1 supra. The autoclave was stirred at a temperature of about 90° C. for a period of 44 hours. At the end of this period, there was added to the toluene solution 5 grams of N,N,N',N'-tetrakis(2-hydroxypropyl)ethylenediamine. The polymer was precipitated from the toluene solution by the addition of hexane thereto, then recovered by decantation, and dried under vacuum at about 35° C. A yield of 62 grams of resinous polymer was obtained which had a reduced viscosity value of 1.2 in acetonitrile. By iodine titration, the resin was shown to be a copolymer containing 11 percent allyl glycidyl ether combined in the resin. A portion of this resin was molded into a plaque which was found to have a stiffness of 10,000 p.s.i. (by A.S.T.M. test D-747-50).

In an analogous manner as above, when 100 grams of 1,2-epoxyhexane and 200 grams of 1,2-epoxy-3-methyl-4-pentene are polymerized in the presence of 1.5 weight percent of the above-designated catalyst, a resinous copolymer is obtained which, upon infra-red analysis, discloses ethylenic unsaturation.

It is obvious that reasonable variations and modifications of this invention can be made without departing from the spirit and scope thereof.

What is claimed is:

1. A solid copolymer of a lower 1,2-alkylene oxide in copolymerized form with an vinyl epoxy monomer having the formula:

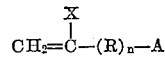

wherein $n$ is an integer selected from the group consisting of zero and one, wherein X is selected from the group consisting of hydrogen, halogen, and alkyl, wherein R is a divalent saturated aliphatic hydrocarbon radical, and wherein A is selected from the group consisting of vicinal-epoxyalkyl, vicinal-epoxyalkoxy, vicinal-epoxycycloalkoxy, vicinal-epoxycycloalkylalkoxy, vicinal-epoxyalkylaryl, and vicinal-epoxyalkylsulfonyl; said copolymer resulting from the reaction, solely through the vicinal epoxy groups, of said 1,2-alkylene oxide with said vinyl epoxy monomer.

2. The composition of claim 1 wherein said lower 1,2-alkylene oxide is ethylene oxide.

3. A solid copolymer which results from the reaction of an admixture containing a lower 1,2-alkylene oxide and a vicinal-epoxyalkyl substituted-alkene-1, said reaction being effected through the vicinal epoxy groups.

4. A solid copolymer which results from the reaction of an admixture containing a lower 1,2-alkylene oxide and an alk-1-enyl vicinal-epoxyalkyl ether, said reaction being effected through the vicinal epoxy groups.

5. A solid copolymer which results from the reaction of an admixture containing a lower 1,2-alkylene oxide and an alk-1-enyl vicinal-epoxycycloalkylalkyl ether, said reaction being effected through the vicinal epoxy groups.

6. A solid copolymer which results from the reaction of an admixture containing ethylene oxide and butadiene monoxide, said reaction being effected through the epoxy group of said ethylene oxide and said butadiene monoxide.

7. A solid copolymer which results from the reaction of an admixture containing ethylene oxide and allyl glycidyl ether, said reaction being effected through the epoxy group of said ethylene oxide and said allyl glycidyl ether.

8. A solid copolymer which results from the reaction of an admixture containing a lower 1,2-alkylene oxide and allyl glycidyl ether, said reaction being effected through the epoxy group of said lower 1,2-alkylene oxide and said allyl glycidyl ether.

9. The composition of claim 8 wherein said lower 1,2-alkylene oxide is propylene oxide.

10. A solid copolymer which results from the reaction of an admixture containing a lower 1,2-alkylene oxide and butadiene monoxide, said reaction being effected through the epoxy group of said lower 1,2-alkylene oxide and said butadiene monoxide.

11. The composition of claim 10 wherein said lower 1,2-alkylene oxide is propylene oxide.

References Cited in the file of this patent

UNITED STATES PATENTS

| | | |
|---|---|---|
| 2,476,922 | Shokal et al. | July 19, 1949 |
| 2,680,109 | Stevens et al. | June 1, 1954 |
| 2,765,296 | Strain | Oct. 2, 1956 |
| 2,870,099 | Borrows et al. | Jan. 20, 1959 |
| 2,870,100 | Stewart et al. | Jan. 20, 1959 |
| 2,970,984 | D'Alelio | Feb. 7, 1961 |